United States Patent [19]
Hosaka

[11] 3,784,841
[45] Jan. 8, 1974

[54] ELECTRIC POWER SUPPLY SYSTEM

[75] Inventor: Akio Hosaka, Yokohama City, Japan

[73] Assignee: Nissan Motor Company, Limited, Yokohama City, Japan

[22] Filed: Nov. 28, 1972

[21] Appl. No.: 310,098

[30] Foreign Application Priority Data
Feb. 19, 1972  Japan.............................. 47/19983

[52] U.S. Cl....................... 307/64, 307/72, 307/85, 307/145
[51] Int. Cl................................................. H02j 9/06
[58] Field of Search .................. 307/51, 56, 64, 66, 307/72, 74, 85, 109, 146; 317/151; 323/15, 74

[56]  References Cited
UNITED STATES PATENTS
3,571,659  3/1971  Anzai et al........................ 317/151
3,262,018  7/1966  Bogaerts et al.................. 307/64 X

*Primary Examiner*—A. D. Pellinen
*Attorney*—John Lezdey

[57]  ABSTRACT

An electric power supply system having a capacitor as an auxiliary power source in addition to a DC battery as a main power source. In this power supply system, the capacitor is charged only through a resistor by a source voltage of the DC battery to a voltage approximately equal to the source voltage. The resistor has a value of resistance considerably higher than that of a load to be connected with the power supply system. The DC battery is grounded at its positive or negative terminal. The power supply system is adapted for energizing an actuator of a safety device for a motor vehicle.

4 Claims, 4 Drawing Figures

PATENTED JAN 8 1974    3,784,841

ELECTRIC POWER SUPPLY SYSTEM

The present invention relates in general to an improved electric power supply system and, more particularly, to a DC electric power supply system having an auxiliary power source in addition to a main power source which is adapted for energizing an actuator of a safety device for a motor vehicle.

It is well known that a motor vehicle is usually provided with a safety device for protecting the occupant from injury in the event the motor vehicle encounters a collision. A known safety device includes an actuator comprising a detonator for firing an explosive charge and an impact-responsive sensor for sensing an impact during the collision, which is connected in series to a suitable DC power supply. Generally, a DC battery mounted on a vehicle body is employed as a DC power supply. There is however, a fear of such a DC battery becoming inoperative due to shocks, vibrations or physical breakage caused by the collision of the motor vehicle. For instance, the DC battery per se could be destroyed or broken down, or electric connectors interconnecting the battery and the actuator could be cut or disconnected from the battery so that a complete power supply circuit can not be formed. To solve this problem, a DC power supply system for use with a safety device includes an auxiliary power source having a capacitor in addition to a DC battery as the main power source.

The prior art electric power supply system of the above-specified type generally comprises a DC battery as the main power source, and a capacitor as the auxiliary power source serially connected to the DC power source through a series circuit which is formed by a resistor and a rectifier or diode for preventing a discharge current across the capacitor from flowing back into the DC battery. However, it is noted that the diode causes a voltage drop thereacross when a forward current flows therethrough. With the above arrangement in which the capacitor is connected in series to the DC battery through the diode, the capacitor will not be sufficiently charged due to the voltage drop caused by the diode. As a result, a sufficient discharge current will not flow from the capacitor into a load, i.e., an actuator of the safety device for a motor vehicle so that the actuator can not be effectively energized.

Thus, there is a continuing need for an improved electric power supply system.

It is, therefore, an object of the present invention to provide an improved electric power supply system overcoming the above problem of the prior art.

Another object of the present invention is to provide an improved DC power supply system having an auxiliary power source in addition to a main power source.

Still another object of the present invention is to provide an improved DC power supply system capable of reliably energizing an actuator of a safety device for a motor vehicle through the auxiliary power source even though the main power source could become inoperative during the collision.

Briefly stated, in accordance with the present invention an improved DC power supply system is provided in which a capacitor as an auxiliary power source may be charged straight through a resistor without a rectifier or diode to a voltage approximately equal to the source voltage of a DC battery as the main power source.

Further, in accordance with the present invention the resistor has a value of resistance considerably higher than that of the actuator provided for this system so that most of the discharge current will flow into the actuator, even though the main power source might become inoperative during the collision.

The present invention is limited only by the appended claims. A better understanding of the above and further objects and advantages of the present invention may be obtained by referring to the following detailed description taken in conjunction with the drawing in which like reference numerals and characters designate similar parts throughout various figures and in which:

It is intended that the electric power supply system of the present invention be applicable to a large variety of electric or mechanical devices, particularly those which require an auxiliary power source. However, the specific embodiments described herein are designed to apply to an actuator of a safety device for a motor vehicle.

Figure 1:
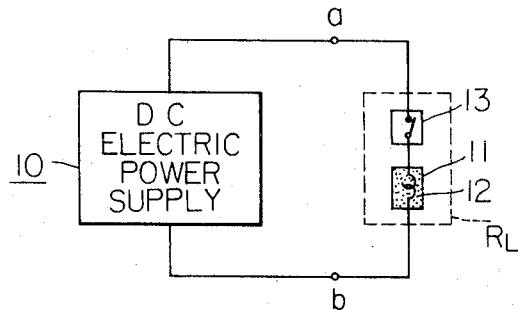
FIG. 1 is a schematic block diagram illustrating an overall arrangement in which an electric power supply system is connected to a load.

Referring now to the drawings, FIG. 1 illustrates an overall arrangement wherein a DC electric power supply system generally indicated by numeral 10 is connected to a load $R_L$, i.e., an actuator of a safety device for a motor vehicle. The actuator is shown as having a detonator 11 adapted for firing an explosive charge 12, which is connected in series to an impact responsive sensor 13 for sensing an impact resulting from a collision of the motor vehicle. The detonator 11 and the sensor 13 are connected in series to two output terminals (a) and (b) of the DC power supply system 10.

Figure 2:
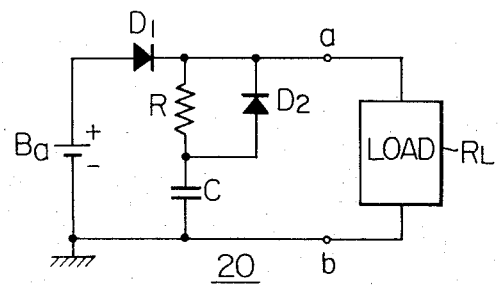
FIG. 2 is a schematic circuit diagram of a prior art electric power supply system.

With reference to FIG. 2, there is shown a prior art DC electric power supply system generally indicated by a reference numeral 20. In this system, the main power source is a DC battery $Ba$ usually mounted on a vehicle body and grounded at its negative terminal. Connected to a positive terminal of the battery $Ba$ is an anode of a rectifier or diode $D_1$ through which a current flows from the positive terminal of the battery $Ba$ in only one direction, that is, in the forward direction. To a cathode of the diode $D_1$ is connected one terminal of a resistor R, another terminal of which is connected to one terminal of a capacitor C as an auxiliary power source. Another terminal of the capacitor C is connected to the negative terminal of the battery $Ba$. The resistor R is shunted by a rectifier or diode $D_2$ which serves to pass therethrough a discharge current from the capacitor C in the forward direction. Two output terminals (a) and (b) are provided and connected to a cathode of the diode $D_2$ and the negative terminal of the battery $Ba$, respectively. Connected across these output terminals (a) and (b) is the load $R_L$, i.e., an actuator of a safety device for a motor vehicle, as mentioned above. The resistor R serves to suppress the charging current flowing through the capacitor C from becoming so large as to damage or even to destroy either the capacitor C or the battery Ba. With this arrangement, the capacitor C is charged by the source voltage at a rate which depends upon the value of resistances of the resistor R and the diode $D_1$ and the magnitude of the source voltage so that an amount of DC electric energy will be stored in the capacitor D dependently upon the capacitance thereof.

In operation, in the event the motor vehicle encounters a collision, when the main power source is normally operative, the actuator of the safety device is directly supplied with a DC electric energy stored in the battery Ba through the diode $D_1$ and the output terminals (a) and (b) so as to have the actuator energized. On the other hand, if the main power source happens to become inoperative due to shocks, vibrations or physical breakage caused by the collision, the auxiliary power source, i.e., the capacitor C may be in turn operable effectively and the DC electric energy stored in the capacitor C will be supplied to the actuator through the diode $D_2$ and the output terminals (a) and (b) so as to have the actuator energized.

When, however, considering this prior art power supply system 20, there arises a problem that the capacitor C can not be sufficiently charged because the capacitor C is connected through the diode $D_1$ to the battery Ba. This will be fully discussed below.

Generally, as is well known, the capacitor serves as an energy-storage device. The amount of electric energy stored in a capacitor is given by $$J = \tfrac{1}{2} CV^2$$

where $J$ = electric energy, joules or watt-seconds;
$C$ = capacitance, farads, and
$V$ = voltage or potential across capacitor, volts.

This equation indicates that the electric energy stored in the capacitor is directly proportional to the square of the voltage supplied to the capacitor. This has an important meaning in this system in that the higher the voltage, the more completely a full amount of electric energy is supplied to the capacitor C. In other words, it is desired that the capacitor C should be charged by the source voltage of the DC battery Ba to a voltage approximately equal to the source voltage.

It will be, however, understood to those skilled in the art that the diode $D_1$ causes a considerable voltage drop thereacross when a forward current flows therethrough, resulting in the capacitor C being poorly charged. For instance, if the diode $D_1$ is a silicon diode, the voltage drop is approximately 0.6 to 1.0 volt. Accordingly, if such a silicon diode is employed in this system, the charging voltage supplied to the capacitor C decreases by the magnitude corresponding to the voltage drop caused by the silicon diode, resulting in the electric energy stored in the capacitor C to drop. Further, when the diode has to operate at a low temperature, its voltage drop is extremely remarkable. For instance, at the temperature as $-40°C$, the charging voltage supplied to the capacitor C decreases 10 per cent with regard to the source voltage of the DC battery Ba. As a result, the voltage drop caused by the diode $D_1$ incurs a loss of approximately 20 per cent of the electric energy stored in the capacitor C. This would be apparent from the above-mentioned equation showing a relationship of the charging voltage to the capacitor versus an electric energy stored in the capacitor. Thus, the prior art DC power supply system is inadequate and a serious problem remains to be solved. In order to overcome the above problem, an improved DC power supply system is provided in accordance with the present invention.

Figure 3:
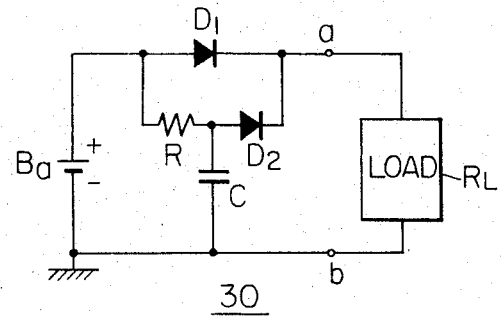
FIG. 3 is a schematic circuit diagram of one preferred embodiment of an electric power supply system in accordance with the present invention.

Referring is now made to FIG. 3 in which a preferred embodiment of a DC power supply system in accordance with the present invention is illustrated, and which is generally designated by numeral 30. In this embodiment, a DC battery Ba is shown as grounded at its negative terminal. Connected to the positive terminal of the battery Ba is an anode of a rectifier or diode $D_1$ through which a forward current flows. A series circuit bypassing the diode $D_1$ is formed by a resistor R having one terminal connected to the positive terminal of the battery Ba and a diode $D_2$ having an anode connected to the other terminal of the resistor R. The diode $D_2$ also allows a forward current to flow therethrough. Connected across the negative terminal of the battery Ba and a junction between the resistor R and the diode $D_2$ is a capacitor C forming an auxiliary power source. The capacitor C is charged only through the resistor R due to a charging current flowing from the positive terminal to the negative terminal of the battery Ba. A load $R_L$, in this case, an actuator of a safety device for a motor vehicle, is connected across two output terminals (a) and (b) which are connected to a cathode of the diode $D_1$ and the negative terminal of the battery Ba, respectively. The elements used in this system function similarly to the corresponding elements forming the prior art power supply system 20 as described above with reference to FIG. 2. Accordingly, more detailed descriptions will be omitted for the sake of simplicity.

From the circuit arrangement of the system shown in FIG. 3, it will be appreciated that a circuit for charging the capacitor C does not involve the diode $D_1$ which causes a voltage drop thereacross as mentioned above. That is, the capacitor C is directly charged by the source voltage of the battery Ba straight through the resistor R without the diode $D_1$ so that the charging voltage across the capacitor C will become approximately equal to the source voltage of the battery Ba. In other words, a full amount of electric energy may be stored in the capacitor C, which is supplied through the diode $D_2$ and the output terminals (a) and (b) to the load $R_L$. Accordingly, the load $R_L$, i.e., an actuator of the safety device may be energized sufficiently even though the battery Ba as a main power source might become inoperative due to shocks, vibrations or physical breakage caused by the collision of the motor vehicle. Additionally, the capacitor C when charged is to a certain degree subject to the influence of a voltage drop caused by the provision of the resistor R due to a leakage current of the capacitor C. This is, however, little worth consideration as weighed against the influence of the voltage drop caused by the diode $D_1$. Furthermore, it should be noted that the resistor R has a value of resistance considerably higher than that of the load $R_L$, especially that of the detonator 11 (see FIG. 1) so that most of electric energy stored in the capacitor C may be supplied through the diode $D_2$ to the actuator.

Figure 4:
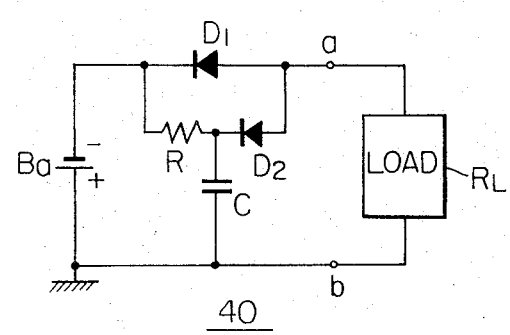
FIG. 4 is a schematic circuit diagram of a modified form of the electric power supply system shown in FIG. 3.

A modified form of the DC power supply system is illustrated in FIG. 4, and is generally designated by numeral 40. In this modification, a DC battery Ba as a main power source is grounded at its positive terminal and thereby having the diodes $D_1$ and $D_2$ connected reversely in its direction. This modified DC power supply system operates and functions essentially similarly to the previously described embodiment of the power supply system shown in FIG. 3. Accordingly, the specific explanations of its operation and function can be dispensed with and hence omitted.

While the present invention has been set forth therein with respect to certain specific embodiments and illustrations thereof, many modifications and changes will readily be made to those skilled in the art. The appended claims are therefore intended to cover all such modifications and changes which fall within the true scope of the present invention.

What is claimed is:

1. An electric power supply system for energizing a load such as an actuator of a safety device of a motor vehicle comprising:

a main DC power source comprising a battery;

a first diode having one terminal connected to one terminal of said bettery so as to permit a current to flow through said battery in only one direction from the positive to negative terminals of said battery;

a series circuit bypassing said first diode, said series circuit formed by a resistor having one terminal connected to said one terminal of said battery and a second diode having one terminal connected to the other terminal of said resistor;

two output terminals, one connected to the other terminal of said battery and the other output terminal to the other terminals of said first and second diodes, and with the actuator load connected between said two output terminals; and an auxiliary power source comprising a capacitor having one terminal connected to the other terminal of said battery and the other terminal to a junction between said resistor and said second diode, whereby said capacitor is charged by the source voltage of said battery through said resistor to a voltage approximately equal to said battery, and a discharge current from said capacitor flows through said second diode to said actuator.

2. An electric power supply system as claimed in claim 1, in which said battery is grounded at its negative terminal.

3. An electric power supply system as claimed in claim 1, in which said battery is grounded at its positive terminal.

4. An electric power supply system as claimed in claim 1, in which said resistor has a value of resistance higher than that of said load.

* * * * *